Jan. 12, 1926. 1,569,557
J. W. McMANAMA
RAILROAD TRACK CURVE
Filed May 20, 1925
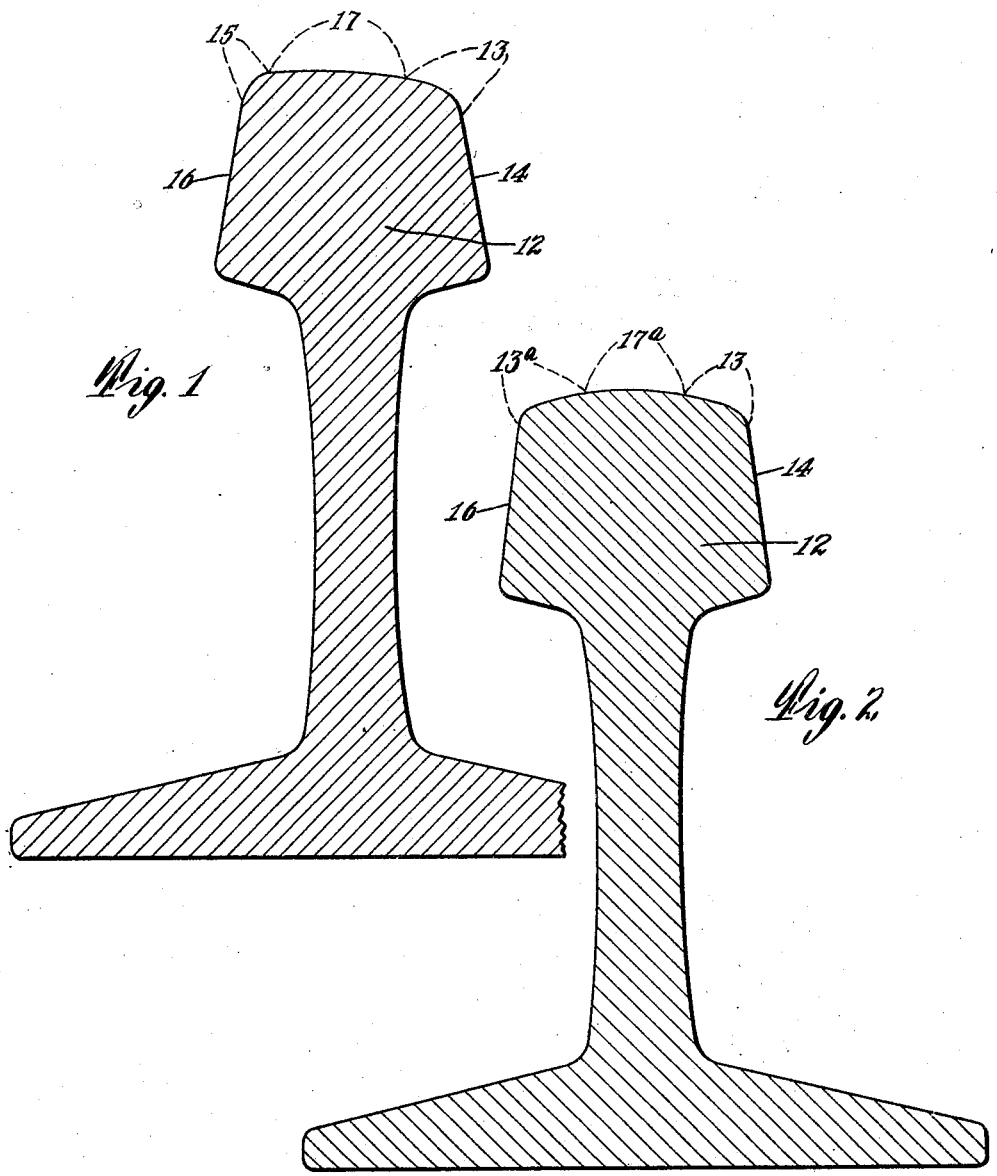

Patented Jan. 12, 1926.

1,569,557

UNITED STATES PATENT OFFICE.

JOHN W. McMANAMA, OF WALTHAM, MASSACHUSETTS, ASSIGNOR OF ONE-THIRD TO SAMUEL W. SIMONDS, OF BROOKLINE, MASSACHUSETTS, AND ONE-THIRD TO FRANCIS A. BARBEY, OF CAMBRIDGE, MASSACHUSETTS.

RAILROAD-TRACK CURVE.

Application filed May 20, 1925. Serial No. 31,513.

*To all whom it may concern:*

Be it known that I, JOHN W. McMANAMA, a citizen of the United States, residing at Waltham, in the county of Middlesex and State of Massachusetts, have invented new and useful Improvements in Railroad-Track Curves, of which the following is a specification.

This invention relates to the inner rail of a railroad track curve, and particularly to a curved inner rail having its tread face reduced in width from the standard size to minimize frictional resistance to side slip of wheels thereon, as set forth by my prior Patent No. 1,006,579, dated October 24, 1911.

The contour of the tread faces of rails embodying said patented invention has heretofore been such that the tread faces have been deformed more or less, by wear caused by tire treads rolling thereon, particularly when the contour of such tire treads has been changed by wear from the original contour. It has been found that the portion of the tire tread adjacent to the gage side of the rail head acquires a transverse curvature or arc of smaller radius than the original curvature, and that the central portion of the tread, and the portion adjacent to the opposite side of the head, becomes distorted or deformed by the displacement of the metal toward the outer side of the head.

The object of the present invention is to prevent this deformation and provide an original contour adapted to be worn down evenly at all parts, without distortion or deformation, so that the contour, after long continued wear, remains practically the same as the original contour.

Of the accompanying drawings forming a part of this specification.—

Figures 1 and 2 are transverse sections of an inner rail characterized as set forth in my above-mentioned patent, and further characterized by my improved tread face contour.

The same reference characters indicate the same parts in all of the figures.

In each of the illustrated embodiments of the invention, the cross section of the tread face of the rail head 12 is of crowning form.

In the embodiment shown by Figure 1, the tread includes a marginal salient tractrix curve 13, merging into a side face 14 of the head, a marginal curve 15, merging into the opposite side face 16, and an intermediate salient curve 17, merging into the marginal curves 13 and 15. In this embodiment, the side 14 is the gage side, and the rail is non-symmetrical in cross section. The curve 15 is an arc of a circle having a short radius, and the intermediate curve 17 is inclined slightly upward from the curve 13, to the curve 15.

In the embodiment shown by Figure 2, either of the sides 14 and 16 may be the gage side. The tread includes the salient tractrix curve merging into the side 14. The salient curve merging into the side 16 is also a tractrix curve $13^a$, the curves 13 and $13^a$ merging into the salient intermediate curve $17^a$ which is of lesser length than the curve 17, and is centrally arranged, and is inclined slightly downward from the longitudinal median line of the tread to the marginal curves, so that the tread is bi-symmetrical.

I have found that when a tire tread which includes a marginal tractrix curve merging into the gage side of the head and into an intermediate salient curve between the sides of the head, so that the curves collectively form a crowning contour, is worn down by flanged tire treads, the tractrix curve and the intermediate curve are each worn down evenly, without change of contour, and without the lateral outward displacement or crowding of the metal on which the intermediate curve is formed, heretofore experienced in rails of ordinary contour.

The intermediate curve 17 or $17^a$ is preferably a segment of a parabolic curve, having its focus at approximately three inches below the curve, the focus being at one side of the vertical center of the rail in the form shown by Figure 1, and in the same vertical plane with said center in the form shown by Figure 2.

I claim:

1. An inner rail of a railroad track curve having its tread face reduced in width from the standard size to minimize resistance to side slip of heels thereon, the cross section of the tread face being crowning and including a marginal salient tractrix curve merging into a side face of the rail head, a marginal salient curve merging into the opposite side of the head, and an intermediate salient curve merging into said marginal curves.

2. An inner rail of a railroad track curve having its tread face reduced in width from the standard size to minimize resistance to side slip of wheels thereon, the cross section of the tread face being crowning and including a marginal salient tractrix curve, merging into a side face of the rail head, a marginal salient tractrix curve merging into the opposite side of the head, and an intermediate salient curve merging into said marginal curves.

3. An inner rail of a railroad track curve having its tread face reduced in width from the standard size to minimize resistance to side slip of wheels thereon, the cross section of the tread face being crowning and including a marginal salient tractrix curve, merging into a side face of the rail head, a marginal salient curve merging into the opposite side of the head, and a salient intermediate curve of parabolic form merging into said marginal curves.

In testimony whereof I have affixed my signature.

JOHN W. McMANAMA.

Certificate of Correction.

It is hereby certified that in Letters Patent No. 1,569,557, granted January 12, 1926, upon the application of John W. McManama, of Waltham, Massachusetts, for an improvement in "Railroad-Track Curves," an error appears in the printed specification requiring correction as follows: Page 1, line 102, claim 1, for the word "heels" read *wheels;* and that the said Letters Patent should be read with this correction therein that the same may conform to the record of the case in the Patent Office.

Signed and sealed this 9th day of March, A. D. 1926.

[SEAL.]
M. J. MOORE,
*Acting Commissioner of Patents.*